(12) United States Patent
Olubummo et al.

(10) Patent No.: US 12,515,397 B2
(45) Date of Patent: *Jan. 6, 2026

(54) THREE-DIMENSIONAL PRINTED PART

(71) Applicant: PERIDOT PRINT LLC, Palo Alto, CA (US)

(72) Inventors: Paul Olubummo, Palo Alto, CA (US); Kristopher J. Erickson, Palo Alto, CA (US); Aja Hartman, Palo Alto, CA (US); Lihua Zhao, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 18/379,071

(22) Filed: Oct. 11, 2023

(65) Prior Publication Data

US 2024/0042680 A1    Feb. 8, 2024

Related U.S. Application Data

(63) Continuation of application No. 16/080,221, filed as application No. PCT/US2017/039776 on Jun. 28, 2017, now Pat. No. 11,801,631.

(51) Int. Cl.
*B29C 64/124* (2017.01)
*B29C 64/165* (2017.01)
(Continued)

(52) U.S. Cl.
CPC .......... *B29C 64/124* (2017.08); *B29C 64/165* (2017.08); *B29C 64/218* (2017.08);
(Continued)

(58) Field of Classification Search
CPC ... B29C 64/124; B29C 64/165; B29C 64/218; B29C 64/314; B29C 64/205; B33Y 10/00; B33Y 30/00; B33Y 40/10; B33Y 70/00

See application file for complete search history.

(56) References Cited

U.S. PATENT DOCUMENTS

| 4,131,587 A | 12/1978 | Brenner |
|---|---|---|
| 8,350,880 B2 | 1/2013 | Dinescu et al. |

(Continued)

FOREIGN PATENT DOCUMENTS

| EP | 0514913 A2 | 11/1992 |
|---|---|---|
| EP | 0553651 A1 | 8/1993 |

(Continued)

OTHER PUBLICATIONS

Wypych, G., "Plasticizers Use and Selection for Specific Polymers," Chapter 11 in Handbook of Plasticizers, 1st edition, ChemTec Publishing, 2003, pp. 273-379.

*Primary Examiner* — Michael M. Robinson
(74) *Attorney, Agent, or Firm* — Dierker & Kavanaugh, P.C.

(57) ABSTRACT

In an example, a three-dimensional (3D) printed part comprises a plurality of fused build material layers including exterior layers and interior layers. At least some of the interior layers include a composite portion having a miscible solid physically bonded to an amide functionality or an amine functionality of the build material. The miscible solid is a solid at a room temperature ranging from about 18° C. to about 25° C.

20 Claims, 4 Drawing Sheets

(51) Int. Cl.
  *B29C 64/218*   (2017.01)
  *B29C 64/314*   (2017.01)
  *B33Y 10/00*    (2015.01)
  *B33Y 30/00*    (2015.01)
  *B33Y 40/10*    (2020.01)
  *B33Y 70/00*    (2020.01)

(52) U.S. Cl.
  CPC ............ *B29C 64/314* (2017.08); *B33Y 10/00* (2014.12); *B33Y 30/00* (2014.12); *B33Y 40/10* (2020.01); *B33Y 70/00* (2014.12)

(56) References Cited

U.S. PATENT DOCUMENTS

| | | | |
|---|---|---|---|
| 8,455,578 | B2 | 6/2013 | Dinescu et al. |
| 8,506,862 | B2 | 8/2013 | Giller et al. |
| 2003/0004225 | A1 | 1/2003 | Sarma et al. |
| 2005/0003189 | A1 | 1/2005 | Bredt et al. |
| 2011/0156301 | A1 | 6/2011 | Giller et al. |
| 2014/0162033 | A1* | 6/2014 | Giller .................... B33Y 10/00 428/209 |
| 2017/0043535 | A1* | 2/2017 | Ng ......................... B33Y 50/02 |
| 2018/0296343 | A1* | 10/2018 | Wei ....................... B33Y 50/00 |

FOREIGN PATENT DOCUMENTS

| | | |
|---|---|---|
| EP | 1525973 A1 | 4/2005 |
| FR | 2907367 A1 | 4/2008 |
| WO | 2017/065796 A1 | 4/2017 |

\* cited by examiner

THREE-DIMENSIONAL PRINTED PART

CROSS REFERENCE TO RELATED APPLICATIONS

This application is a continuation of U.S. application Ser. No. 16/080,221, filed Aug. 27, 2018, which itself is a 371 National Stage Entry of International Application No. PCT/US2017/039776, filed on Jun. 28, 2017, the contents of each of which are incorporated herein by reference in their entireties.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
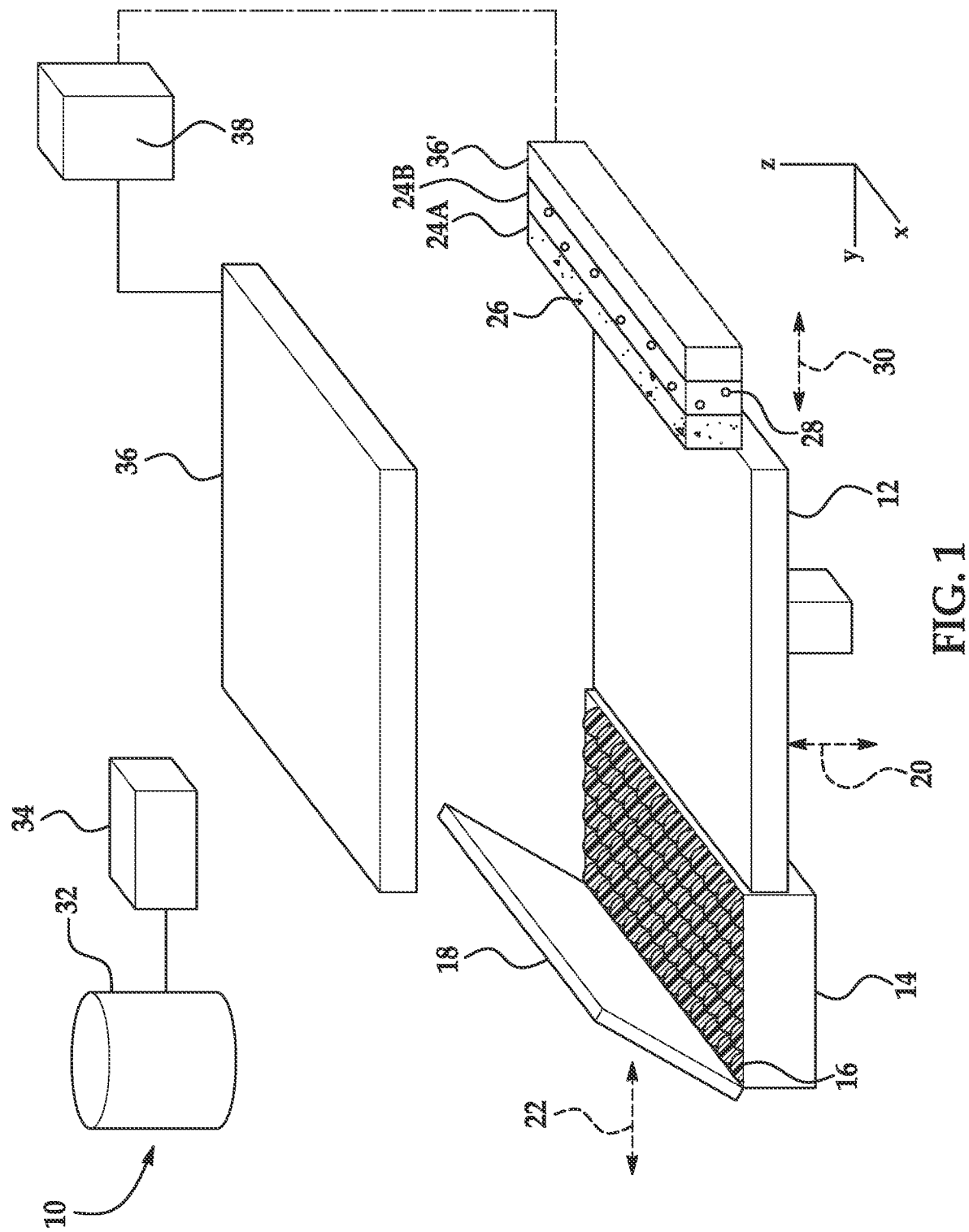
FIG. 1 a simplified isometric and schematic view of an example of a 3D printing system disclosed herein.

Examples of the three-dimensional (3D) printing method and the 3D printing system disclosed herein may utilize a fusing agent. During these examples, an entire layer of a build material (also referred to as build material particles) is exposed to radiation, but a selected region (in some instances less than the entire layer) of the build material is fused and hardened to become a layer of a 3D part. The fusing agent is selectively deposited in contact with the selected region of the build material. The fusing agent(s) is capable of at least partially penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

Traditionally, forming a part in this manner with a specific desired mechanical property involved the use of a build material with the desired mechanical property or the use of an additive in the build material particles. Using a specific build material or additive within the build material does not easily allow for the formation of parts with different mechanical properties in different areas, or parts with gradient mechanical properties.

In the examples disclosed herein, a traditional polymeric build material may be used without modification prior to applying the polymeric build material to a fabrication bed or other support member. This is due to the fact that a ductility tailoring agent is selectively jetted on the build material during the printing process, which imparts the ductility to the particular area(s) of the build material exposed to the ductility tailoring agent as the individual layer(s) of the 3D object/part is/are being formed. The ability to jet the ductility tailoring agent via any suitable inkjet printing technique enables controlled (and potentially varying) ductility to be introduced at the voxel level.

In the examples disclosed herein, the ductility tailoring agent includes a miscible solid that is at least partially soluble in a water-based solvent system. By "at least partially soluble" it is meant that the miscible solid is at least 10% soluble in water or in a water-based solvent system including at least 25% water (by weight). This solubility enables the miscible solid to be present in the ductility tailoring agent at a higher loading than if the solid were not soluble, and also contributes to the jettability of the miscible solid.

Moreover, the miscible solid is compatible with an amide functionality (i.e., amide group,

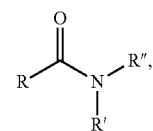

wherein R, R' and R" are independently selected from H, an alkyl, an alkene, an ester, an ether, or a phenyl) or an amine functionality (i.e., an amine group,

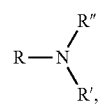

wherein R, R' and R" are independently selected from H, an alkyl, an alkene, an ester, an ether, or a phenyl). By "compatible," it is meant the miscible solid includes at least one functional group that physically bonds with the amide group(s) or the amine group(s) of the build material. The physical bond may be a hydrogen bond or a van der Waals bond. In an example, methyl-benzene sulfonamide provides intermolecular hydrogen bonding with polyamide by anchoring the sulfonamide proton onto the lone pair of the carbonyl group(s) of the polyamide. This creates a strong physical bond between the miscible solid and the carbonyl of the amide group(s). In another example, the miscible solid interacts with the amine group of a polyamine, which creates a strong physical bond between the miscible solid and the amine group(s). The miscible solid is also a solid at room temperature (i.e., ranging from about 18° C. to about 25° C.). The physical bond and the solid phase of the miscible solid enable the miscible solid to stay bound within the fused polymer matrix under normal use conditions (e.g., room temperature), which enhances the mechanical stability of the 3D printed part. In other words, the miscible solid used in the examples disclosed herein does not migrate or leach out of the polymer domain/matrix and does not cause crystal-like growth on the surface of the 3D object. The solid phase also improves fastness because it does not evaporate out of the polymer at room or higher temperatures. Some miscible solid that are liquid at room temperature can easily evaporate and/or may readily migrate out of the polymer domain/matrix and cause crystal-like growth at the 3D object surface.

The physical bond between the miscible solid and the build material imparts greater ductility to the corresponding portion (referred to herein as a "composite portion") of the layer of the 3D part/object, when compared to the fused layer alone (i.e., not in contact with the ductility tailoring agent). As used herein, the "composite portion" refers to any region of the 3D part/object that includes fused build material having the miscible solid physically bonded thereto. Also as used herein "increased ductility" or "greater ductility" refers to an improvement in elongation at break, toughness, resilience, elongation at yield, or elongation at maximum stress in tension, compression, shear, or torsion. As mentioned above, the method(s) disclosed herein enable control over where the ductility is introduced (e.g., at the voxel surface and/or through the voxel volume). By combining mechanical voxels in a controlled fashion using the method(s) disclosed herein, a variety of parts with different ductility at different locations within the part can be created. As examples, the methods disclosed herein may be used to form shoe soles, wings, medical devices, and toothbrushes, especially when different ductility is desired in different portions of the part.

It is to be understood that in the examples disclosed herein, a single ductility level or several different ductility levels may be imparted to a single layer of polymeric build material and/or a single layer of the 3D object/part. The same level or different levels of ductility may also be imparted to different layers of the 3D object/part. It is also to be understood that to form a multi-layered structure with different ductility levels, different ductility tailoring agents or different amounts of the same ductility tailoring agent may be jetted in sequential layers. In these types of structures, gradient ductility may be formed. As an example, a higher loading of the ductility tailoring agent may be selectively jetted to impart a higher ductility level on the build material layer, and a lower loading of the same ductility tailoring agent may be selectively jetted on a different area of the same build material layer or on a different build material layer to impart a lower ductility level on the different area or the different layer. As another example, a first ductility tailoring agent may be selectively jetted (on at least a portion of a first layer of the polymeric build material) to impart a first ductility level on the first build material layer, and then a second ductility tailoring agent may be selectively jetted on a second build material layer to impart a second ductility level that is different than the first ductility level (e.g., increased ductility as compared to the first ductility level).

The ductility tailoring agent disclosed herein includes a miscible solid and water-based solvent system. In some examples, the ductility tailoring agent consists of the miscible solid and the water-based solvent system with no other components.

The ductility tailoring agent is jettable. As used herein, the term "jettable" means that the ductility tailoring agent is capable of being jetted or deposited from a thermal inkjet printhead, a continuous inkjet printhead, and/or a piezoelectric inkjet printhead.

As mentioned above, the miscible solid imparts greater ductility to the composite portion of the layer of the 3D part/object (as compared to the fused layer alone). The miscible solid acts a lubricant and reduces intermolecular friction between polymer chains of the build material. When heated during the 3D printing process, the miscible solid molecules slip between polymer crystals and weaken and/or prevent polymer chain interactions. Thus, the miscible solid prevents the formation/reformation of a rigid crystal network and reduces the rigidity (and increases the ductility) of the polymer matrix (formed from the build material). With the use of the miscible solid, the polymer matrix formed has high flexibility, toughness (i.e., integral under stress strain), and good mechanical strength (e.g., a mechanical strength similar to that of the fused layer alone without the miscible solid). High flexibility may be observed when the elongation at break of the portion patterned with the ductility agent is at least 1.2 times, and in some instances, at least 4 times (4×) the intrinsic elongation at break of the non-patterned portion. In some examples, the increase in elongation at break and/or toughness is up to 10 times (10×) higher than the intrinsic elongation. The mechanical strength of the portion patterned with the ductility agent, in terms of tensile strength, may decrease slightly compared to tensile strength of the non-patterned portion. However, any decrease in tensile strength is minimal compared to the increase in toughness or elongation at break.

As mentioned above, the miscible solid is i) at least partially soluble in the water-based solvent system (i.e., at least 10 wt % soluble in water or in a water-based solvent system including at least 25 wt % water), ii) compatible with the amide functionality of the build material (i.e., includes at least one functional group that physically bonds with the amide group(s) of the build material), and iii) solid at room temperature (i.e., ranging from about 18° C. to about 25° C.). The at least partial solubility of the miscible solid in the water-based solvent system contributes to the ductility tailoring agent's ability to be jetted. The miscible solid's compatibility with the amide functionality of the build material and its solid phase at room temperature contribute to the miscible solid's ability to remain in the 3D printed part and not leach out of the polymer domain/matrix.

In some examples, the miscible solid is selected from the group consisting of 2-methyl-benzene sulfonamide, a mixture of 4-methyl-benzene and 2-methyl-benzene sulfonamide, N-butylbenzenesulfonamide (BBSA), N-ethylbenzenesulfonamide (EBSA), N-propylbenzenesulfonamide (PBSA), N-butyl-N-dodecylbenzenesulfonamide (BDBSA), N,N-dimethylbenzenesulfonamide (DMBSA), p-methyl-benzenesulfonamide, o/p-toluene sulfonamide, p-toluene sulfonamide, 2-ethylhexyl-4-hydroxybenzoate, hexadecyl-4-hydroxybenzoate, 1-butyl-4-hydroxybenzoate, dioctyl phthalate, diisodecyl phthalate, di-(2-ethylhexyl) adipate, tri-(2-ethylhexyl) phosphate, and combinations thereof.

The miscible solid may be present in the ductility tailoring agent in an amount that ranges from about 10 wt % to about 75 wt % (based on the total wt % of the ductility tailoring agent). In an example, the miscible solid is present in the ductility tailoring agent in an amount of about 40 wt % (based on the total wt % of the ductility tailoring agent). In another example, the miscible solid is present in the ductility tailoring agent in an amount of about 20 wt % (based on the total wt % of the ductility tailoring agent). It is believed these miscible solid loadings provide a balance between the ductility tailoring agent having jetting reliability and effectively imparting ductility.

The miscible solid is combined with the water-based solvent system to form the ductility tailoring agent. As used herein, "water-based solvent system" refers to either water alone or a solvent system including at least 25 wt % water. When the water-based solvent system includes components in addition to water, the water-based solvent system may include co-solvent(s), humectant(s), surfactant(s), antimicrobial agent(s), anti-kogation agent(s), chelating agent(s), scale inhibitor(s), anti-deceleration agent(s), dispersant(s), or combinations thereof.

In an example, the water-based solvent system may consist of water and co-solvent(s) with no other components. In another example, the water-based solvent system may consist of water and humectant(s) with no other components. In still another example, the water-based solvent system may consist of water, co-solvent(s), and humectant(s) with no other components. In yet another example, the water-based solvent system may consist of water, co-solvent(s), humectant(s) and any of surfactant(s), antimicrobial agent(s), anti-kogation agent(s), chelating agent(s), scale inhibitor(s), anti-deceleration agent(s), and/or dispersant(s).

The aqueous nature of the water-based solvent system may enable the ductility tailoring agent to penetrate, at least partially, into the layer of build material. If the build material is hydrophobic, the presence of a co-solvent, a surfactant, and/or a dispersant in the water-based solvent system may assist in obtaining a particular wetting behavior.

Examples of suitable co-solvents that may be included in the water-based solvent system include 1,6-hexanediol, dimethyl sulfoxide (DMSO), isopropyl alcohol, ethanol, acetone, and combinations thereof.

Whether a single co-solvent is used or a combination of co-solvents is used, the total amount of co-solvent(s) in the ductility tailoring agent may range from about 1 wt % to about 67.5 wt % based on the total wt % of the ductility tailoring agent. In an example, the co-solvent(s) is/are present in the ductility tailoring agent in an amount of about 40 wt % (based on the total wt % of the ductility tailoring agent).

Examples of suitable humectants that may be included in the water-based solvent system include 1-methyl-2-pyrrolidone, N-2-hydroxyethyl-2-pyrrolidone, 2-pyrrolidinone, and combinations thereof.

Whether a single humectant is used or a combination of humectants is used, the total amount of humectant(s) in the ductility tailoring agent may range from about 0.25 wt % to about 40 wt % based on the total wt % of the ductility tailoring agent. In an example, the humectant(s) is/are present in the ductility tailoring agent in an amount of about 40 wt % (based on the total wt % of the ductility tailoring agent). In another example, the humectant(s) is/are present in the ductility tailoring agent in an amount of about 20 wt % (based on the total wt % of the ductility tailoring agent).

Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the ductility tailoring agent may range from about 0.1 wt % to about 4 wt % based on the total wt % of the ductility tailoring agent. In an example, the surfactant(s) is/are present in the ductility tailoring agent in an amount of about 1.6 wt % (based on the total wt % of the ductility tailoring agent).

The water-based solvent system may include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the ductility tailoring agent may include a total amount of antimicrobial agents that ranges from about 0.1 wt % to about 1 wt %. In an example, the antimicrobial agent(s) is/are a biocide and is/are present in the ductility tailoring agent in an amount of about 0.36 wt % (based on the total wt % of the ductility tailoring agent).

An anti-kogation agent may also be included in the water-based solvent system (e.g., when the ductility tailoring agent is to be used with thermal inkjet printing). Kogation refers to the deposit of dried ink (e.g., ductility tailoring agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the ductility tailoring agent may range from about 0.1 wt % to about 5 wt % based on the total wt % of the ductility tailoring agent. In an example, the anti-kogation agent(s) is/are present in the ductility tailoring agent in an amount of about 1 wt % (based on the total wt % of the ductility tailoring agent).

The water-based solvent system may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the ductility tailoring agent may range from 0 wt % to about 2 wt % based on the total wt % of the ductility tailoring agent. In an example, the chelating agent(s) is/are present in the ductility tailoring agent in an amount of about 0.08 wt % (based on the total wt % of the ductility tailoring agent).

The water-based solvent system may also include scale inhibitor(s) or anti-deceleration agent(s). One suitable scale inhibitor/anti-deceleration agent is an alkyldiphenyloxide disulfonate surfactant (e.g., DOWFAX™ 8390 and DOWFAX™ 2A1 from The Dow Chemical Company).

The scale inhibitor(s)/anti-deceleration agent(s) may be present in the ductility tailoring agent in an amount ranging from about 0.05 wt % to about 5 wt % of the total wt % of the ductility tailoring agent. In an example, the scale inhibitor(s)/anti-deceleration agent(s) is/are present in the ductility tailoring agent in an amount of about 0.2 wt % (based on the total wt % of the ductility tailoring agent).

The water-based solvent system may also include dispersant(s). Dispersants may be included in the water-based solvent system when the solubility of the miscible solid in the water-based solvent system is low (e.g., <20 wt %) to help at least substantially uniformly distribute the miscible solid throughout the ductility tailoring agent. Examples of suitable dispersants include polymer or small molecule dispersants, charged groups attached to the miscible solid surface, or other suitable dispersants. Some specific examples of suitable dispersants include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins. When utilized, dispersant(s) may be present in an amount ranging from about 0.1 wt % to about 20 wt % of the total wt % of the ductility tailoring agent.

In an example, the water-based solvent system is selected from the group consisting of water, N-2-hydroxyethyl-2-pyrrolidone, 1,6-hexanediol, dimethyl sulfoxide (DMSO), isopropyl alcohol (i.e., isopropanol), ethanol, acetone, 2-pyrrolidinone, and mixtures thereof.

The solvent(s) and co-solvent(s) of the water-based solvent system may depend, in part upon the jetting technology that is to be used to dispense the ductility tailoring agent. For example, if thermal inkjet is to be used, water and/or ethanol and/or other longer chain alcohols (e.g., pentanol) may be the primary solvent or co-solvents (i.e., makes up 35 wt % or more of the ductility tailoring agent). For another example, if piezoelectric inkjet is to be used, water may make up from about 25 wt % to about 30 wt % of the ductility tailoring agent, and the primary solvent (i.e., 35 wt % or more) may be ethanol, isopropanol, acetone, etc.

In some examples, the system and method disclosed herein may include another or second ductility tailoring agent. The other or second ductility tailoring agent includes at least another or second miscible solid, which may impart a ductility level that is different than the ductility level imparted by the first ductility tailoring agent. The other or second miscible solid included in the other or second ductility tailoring agent is i) at least partially soluble in another or second water-based solvent system (i.e., at least 10 wt % soluble in water or in a water-based solvent system including at least 25 wt % water), ii) compatible with the amide functionality of the build material (i.e., includes at least one functional group that physically bonds with the amide group(s) of the build material), and iii) solid at room temperature. The other or second miscible solid may be included in the other or second ductility tailoring agent in an amount ranging from about 10 wt % to about 75 wt % based on the total wt % of the second or other ductility tailoring agent. The other or second miscible solid may be different than the miscible solid included in the first ductility tailoring agent. Utilizing different miscible solids may allow for the formation of 3D parts with different ductility levels in different regions (e.g., in the x-y plane) or in different layers (e.g., in the z-direction). As mentioned herein, the formation of 3D parts with different ductility levels in different regions (e.g., in the x-y plane) or in different layers (e.g., in the z-direction) may also be accomplished by adjusting the loading of a single ductility tailoring agent in different regions and/or layers.

The other or second ductility tailoring agent also includes the other or second water-based solvent system. The other or second water-based solvent system used in the other or second ductility tailoring agent may include water alone or a solvent system including at least 25 wt % water. The other or second water-based solvent system may also include any of the components in any of the amounts described in reference to the first ductility tailoring agent. While one additional ductility tailoring agent has been described, it is to be understood that examples of the system and method disclosed herein may include and/or utilize any desirable number of different ductility tailoring agents.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

In an example, the three-dimensional (3D) printing system 10 generally includes a supply 14 of build material 16 containing an amide functionality; a build material distributor 18; a supply of a fusing agent 26; a first inkjet applicator 24A for selectively dispensing the fusing agent 26; a supply of an inkjettable ductility tailoring agent 28, the inkjettable ductility tailoring agent 28 including a water-based solvent system and a miscible solid that is at least partially soluble in the water-based solvent system and that is compatible with the amide functionality of the build material 16; a second inkjet applicator 24B for selectively dispensing the inkjettable ductility tailoring agent 28; a controller 32; and a non-transitory computer readable medium having stored thereon computer executable instructions to cause the controller 32 to: utilize the build material distributor 18 to dispense the build material 16; and utilize the first inkjet applicator 24A and the second inkjet applicator 24B to respectively and selectively dispense the fusing agent 26 and the inkjettable ductility agent 28 to pattern layers of the build material 16 during a three-dimensional printing process 100, 200 (see, e.g., FIGS. 2A through 2E and FIG. 3).

As shown in FIG. 1, the printing system 10 includes the build area platform 12, the build material supply 14 containing build material particles 16 containing an amide functionality, and the build material distributor 18.

The build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 4:
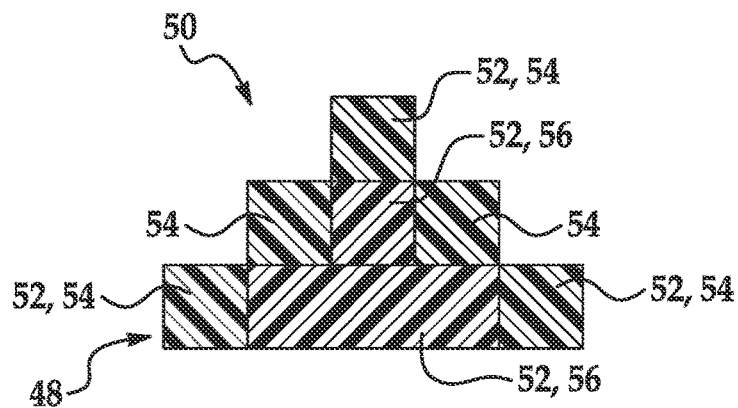
FIG. 4 is a cross-sectional view depicting an example of a 3D printed part disclosed herein.

The build area platform 12 may be moved in a direction as denoted by the arrow 20, e.g., along the z-axis, so that the build material 16 may be delivered to the platform 12 or to a previously formed layer 48 (see, e.g., FIG. 2E) of the 3D part 50 (see, e.g., FIG. 4). In an example, when the build material particles 16 are to be delivered, the build area platform 12 may be programmed to advance (e.g., downward) enough so that the build material distributor 18 can push the build material particles 16 onto the platform 12 to form a substantially uniform layer 40 of the build material 16 thereon (see, e.g., FIGS. 2A and 2B). The build area platform 12 may also be returned to its original position, for example, when a new part is to be built.

The build material supply 14 may be a container, bed, or other surface that is to position the build material particles 16 between the build material distributor 18 and the build area platform 12. In some examples, the build material supply 14 may include a surface upon which the build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material particles 16 from a storage location to a position to be spread onto the build area platform 12 or onto a previously formed layer 48 of the 3D part 50.

The build material distributor 18 may be moved in a direction as denoted by the arrow 22, e.g., along the y-axis, over the build material supply 14 and across the build area platform 12 to spread a layer of the build material 16 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller.

The build material particles 16 contain an amide functionality or an amine functionality. As mentioned above, an amide functionality is an amide group,

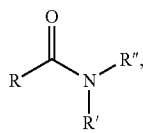

wherein R, R' and R" are independently selected from H, an alkyl, an alkene, an ester, an ether, or a phenyl, and an amine functionality is an amine group,

wherein R, R' and R" are independently selected from H, an alkyl, an alkene, an ester, an ether, or a phenyl. Some specific examples of the build materials 16 that contain an amide functionality include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Another example of a suitable material that contains an amide functionality is polyether block amide (PEBA). An example of a suitable material that contains an amine functionality is polyethylene imine (PEI).

The build material particles 16 may have a melting point or softening point ranging from about 50° C. to about 400° C. Depending upon the composition of the build material 16, the melting or softening point may be higher or lower. As an example, the build material particles 16 may be a polyamide having a melting point of 180° C.

The build material particles 16 may be made up of similarly sized particles or differently sized particles. The term "size", as used herein with regard to the build material particles 16, refers to the diameter of a spherical particle, or the average diameter of a non-spherical particle (i.e., the average of multiple diameters across the particle), or the volume-weighted mean diameter of a particle distribution. In an example, the average size of the build material particles 16 ranges from 2 µm to about 200 µm. In another example, the average size of the build material particles 16 ranges from 20 µm to about 90 µm. In still another example, the average size of the build material particles 16 is about 60 µm.

It is to be understood that the build material 16 may include, in addition to particles containing an amide functionality, a charging agent, a flow aid, or combinations thereof.

Charging agent(s) may be added to the build material 16 to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly beneficial when the particles of the build material 16 are less than 25 µm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material 16.

As shown in FIG. 1, the printing system 10 also includes the first inkjet applicator 24A, which may contain the fusing agent 26.

Examples of the fusing agent 26 are dispersions including a radiation absorbing agent (i.e., an active material). The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from Hewlett-Packard Company.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

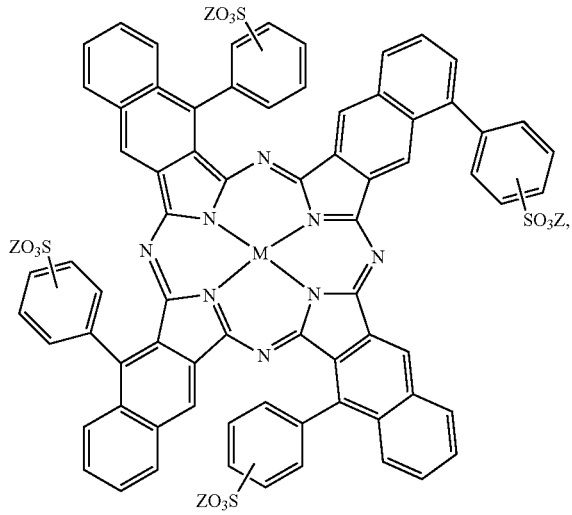

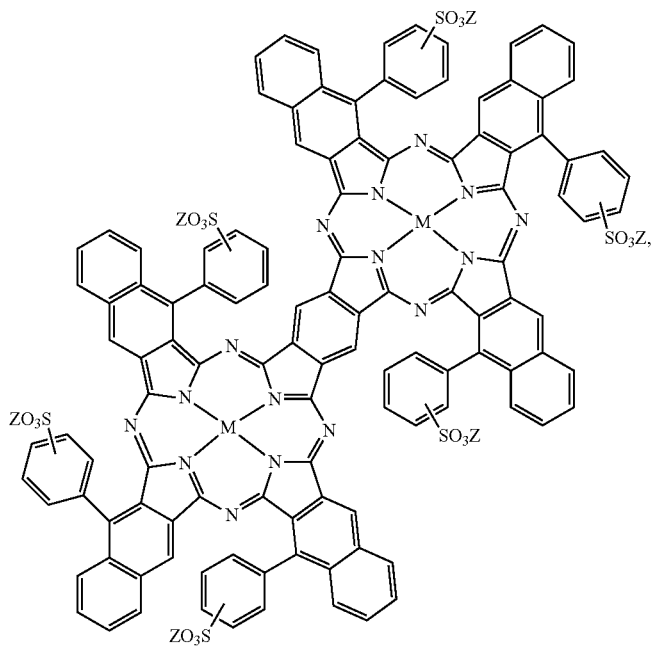

-continued

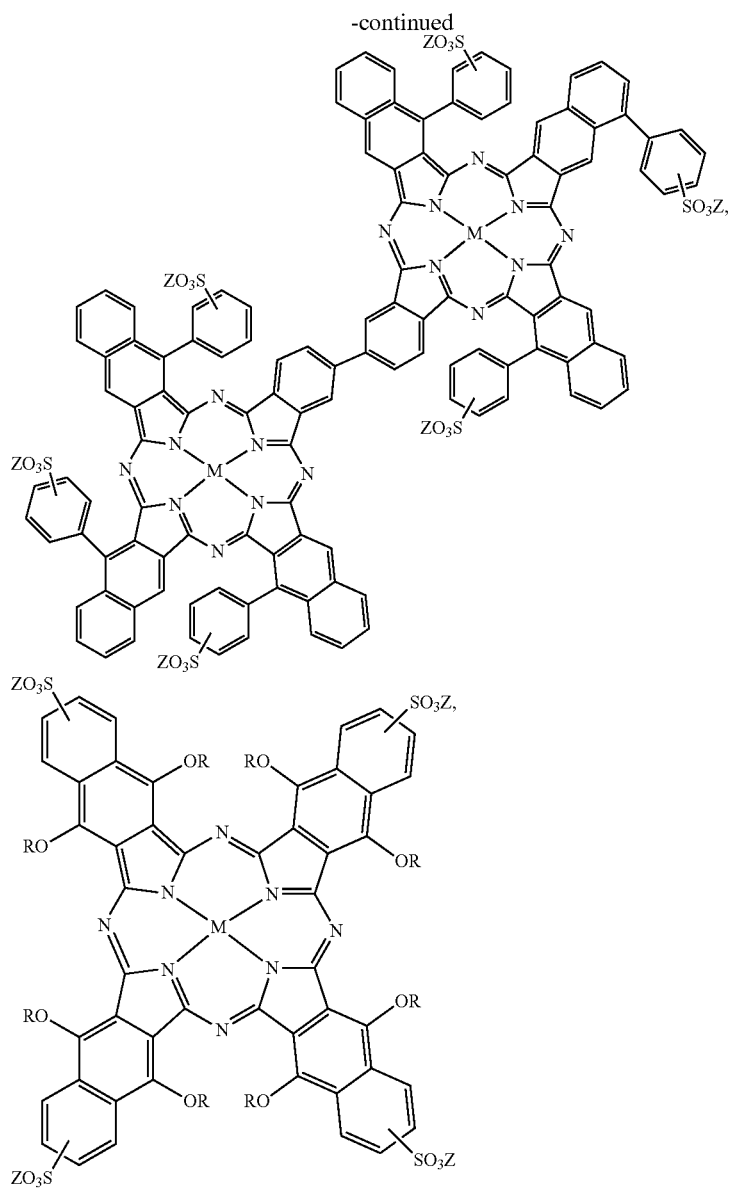

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

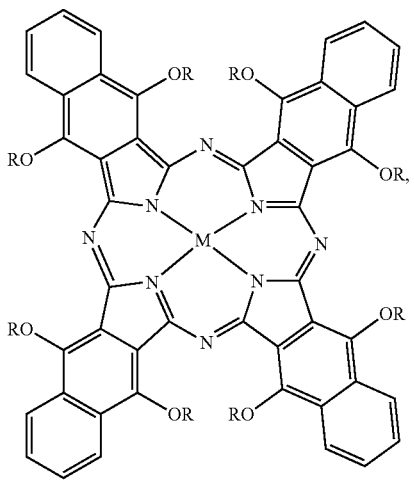

-continued

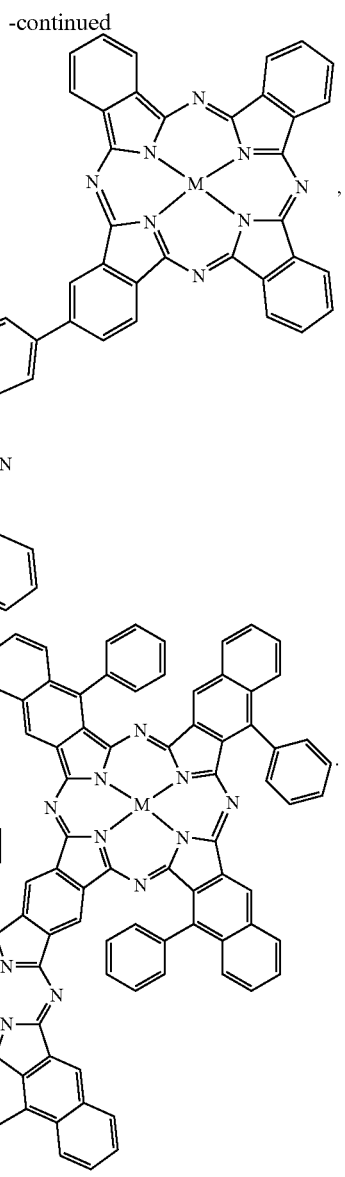

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

In other examples, the active material may be a plasmonic resonance absorber. The plasmonic resonance absorber allows the fusing agent 26 to absorb radiation 46 at wavelengths ranging from 800 nm to 4000 nm (e.g., at least 80% of radiation having wavelengths ranging from 800 nm to 4000 nm is absorbed), which enables the fusing agent 26 to convert enough radiation 46 to thermal energy so that the build material particles 16 fuse. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part 50 to be white or slightly colored.

The absorption of the plasmonic resonance absorber is the result of the plasmonic resonance effects. Electrons associated with the atoms of the plasmonic resonance absorber may be collectively excited by radiation 46, which results in collective oscillation of the electrons. The wavelengths required to excite and oscillate these electrons collectively are dependent on the number of electrons present in the plasmonic resonance absorber particles, which in turn is dependent on the size of the plasmonic resonance absorber particles. The amount of energy required to collectively oscillate the particle's electrons is low enough that very small particles (e.g., 1-100 nm) may absorb radiation 46 with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCuyP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total wt % of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or radiation absorbance efficiency.

As used herein, "FA vehicle" may refer to the liquid fluid in which the active material is placed to form the fusing agent 26. A wide variety of FA vehicles, including aqueous and non-aqueous vehicles, may be used in the fusing agent 26. In some instances, the FA vehicle may include water alone or a non-aqueous solvent alone. In other instances, the FA vehicle may further include co-solvent(s), humectant(s), surfactant(s), antimicrobial agent(s), anti-kogation agent(s), chelating agent(s), scale inhibitor(s), anti-deceleration agent(s), dispersant(s), silane coupling agent(s), or combinations thereof Similar to the water-based solvent system, when the FA vehicle is water-based, the aqueous nature of the fusing agent 26 enables the fusing agent 26 to penetrate, at least partially, into the layer 40 of the build material particles 16. As mentioned above, the build material particles 16 may be hydrophobic, and the presence of the co-solvent, the surfactant, and/or the dispersant in the fusing agent 26 when the fusing agent 26 is water-based or non-aqueous based may assist in obtaining a particular wetting behavior.

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. The dispersant may also aid in the wetting of the fusing agent 26 onto the build material particles 16. Examples of suitable dispersants include those listed above in reference to the water-based solvent system.

Whether a single dispersant is used or a combination of dispersants is used, the total amount of dispersant(s) in the fusing agent 26 may range from about 10 wt % to about 200 wt % based on the wt % of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the wt % of the plasmonic resonance absorber in the fusing agent 26. In an example, the total amount of silane coupling agent(s) in the fusing agent 26 ranges from about 1 wt % to about 30 wt % based on the wt % of the plasmonic resonance absorber. In another example, the total amount of silane coupling agent(s) in the fusing agent 26 ranges from about 2.5 wt % to about 25 wt % based on the wt % of the plasmonic resonance absorber.

The fusing agent 26 may also include any of the previously listed co-solvent(s), humectant(s), surfactant(s), antimicrobial agent(s), anti-kogation agent(s), chelating agent(s), scale inhibitor(s), and/or anti-deceleration agent(s) in the previously described amounts (except that the wt % is based on the total wt % of the fusing agent 26).

The balance of the fusing agent 26 is water or the non-aqueous solvent. As an example, deionized water may be used. As another example, dimethyl sulfoxide (DMSO), acetone, acetates, alcohols (e.g., ethanol), or the like may be used as the non-aqueous solvent. The balance of the fusing agent 26 may depend, in part upon the jetting technology that is to be used to dispense the fusing agent 26. For example, if thermal inkjet is to be used, the balance may be water and/or ethanol. For another example, if piezoelectric inkjet is to be used, the balance may be a variety of solvents, such as methanol, ethanol, isopropanol, acetone, methyl ethyl ketone, other ketones, acetates (e.g., methyl acetate), ethylene glycol ethers, propylene glycol ethers, diols (e.g., 1,3-propanediol), polyols (e.g., glycerol), etc.

In an example, the fusing agent 26 may include CTO nanoparticles as the plasmonic resonance absorber, a zwitterionic stabilizer, and an aqueous vehicle. In one version of this example, the aqueous vehicle may include a surfactant and a balance of water. In another version of this example, the aqueous vehicle of the fusing agent 26 may include a co-solvent, a surfactant, and a balance of water. Any of the co-solvents and/or surfactants previously described may be used in this example of the fusing agent 26 in the respective amounts previously described. This example of the fusing agent 26 may also include a humectant and lubricant.

In this example, the CTO nanoparticles in the fusing agent 26 have a general formula of $Cs_xWO_3$, where $0<x<1$. The cesium tungsten oxide nanoparticles may give the fusing agent 26 a light blue color. The strength of the color may depend, at least in part, on the amount of the CTO nanoparticles in the fusing agent 26. When it is desirable for the 3D part 50 to be white, less of the CTO nanoparticles may be used in the fusing agent 26 in order to achieve the white color. In an example, the CTO nanoparticles may be present in the fusing agent 26 in an amount ranging from about 1 wt % to about 20 wt % (based on the total wt % of the fusing agent 26).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the fusing agent 26 may also include the zwitterionic stabilizer. The zwitterionic stabilizer may improve the stabilization of the fusing agent 26. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the fusing agent 26.

Examples of suitable zwitterionic stabilizers include C2 to C8 betaines, C2 to C8 aminocarboxylic acids having a solubility of at least 10 g in 100 g of water, taurine, and combinations thereof. Examples of the C2 to C8 aminocarboxylic acids include beta-alanine, gamma-aminobutyric acid, glycine, and combinations thereof.

The zwitterionic stabilizer may be present in the fusing agent 26 in an amount ranging from about 2 wt % to about 35 wt % (based on the total wt % of the fusing agent 26). When the zwitterionic stabilizer is the C2 to C8 betaine, the C2 to C8 betaine may be present in an amount ranging from about 8 wt % to about 35 wt % of a total wt % of fusing agent 26. When the zwitterionic stabilizer is the C2 to C8 aminocarboxylic acid, the C2 to C8 aminocarboxylic acid may be present in an amount ranging from about 2 wt % to about 20 wt % of a total wt % of fusing agent 26. When the zwitterionic stabilizer is taurine, taurine may be present in an amount ranging from about 2 wt % to about 35 wt % of a total wt % of fusing agent 26.

In an example of the fusing agent 26, the weight ratio of the CTO nanoparticles to the zwitterionic stabilizer may range from 1:10 to 10:1. In another version of this example of the fusing agent 26, the weight ratio of the CTO nanoparticles to the zwitterionic stabilizer is 1:1.

In another example, the fusing agent 26 is a darker fusing agent, in that it imparts grey or black to the 3D part 50. This example fusing agent generally includes the previously described aqueous or non-aqueous vehicle and a near infrared absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc. This darker fusing agent may be desirable for forming an interior and/or bottom of a 3D part, while the previously described low tint fusing agent may be desirable for forming the exterior or outermost layer(s) of a 3D part.

As depicted in FIG. 1, some examples of the printing system 10 may include a second inkjet applicator 24B in addition to the first inkjet applicator 24A. In one example, the printing system 10 includes the second inkjet applicator 24B, which may contain the ductility tailoring agent 28.

As described above, the ductility tailoring agent 28 includes the miscible solid and the water-based solvent system.

As mentioned above, some examples of the system 10 and method 100, 200 (see, e.g., FIGS. 2A through 2E and 3) disclosed herein may include another or second ductility tailoring agent. In the examples in which the system 10 and method 100, 200 include the other or second ductility tailoring agent, another (e.g., third) inkjet applicator (not shown) may jet the other or second ductility tailoring agent. The third inkjet applicator may be a separate cartridge (for dispensing the other or second ductility tailoring agent) within the first inkjet applicator 24A or the second inkjet applicator 24B, or it may be a separate inkjet applicator.

In some examples, the active material of the fusing agent 26 and the miscible solid of the ductility tailoring agent 28 may be compatible with the same water-base solvent system/liquid vehicle (i.e., able to be incorporated into the same water-based solvent system/vehicle and then successfully dispensed from the inkjet applicator 24A, 24B). When the active material and the miscible solid additive are compatible with the same water-base solvent system/liquid vehicle, the fusing agent 26 and the ductility tailoring agent 28 may be combined into a single fusing/ductility tailoring agent, in which both the active material and the miscible solid are dissolved or dispersed in the same water-based solvent system/liquid vehicle. In these examples, the amount of the single fusing/ductility tailoring agent that is dispensed will control the absorption of the radiation 46 as well as the ductility level that is exhibited.

In the examples in which the fusing agent 26 and the ductility tailoring agent 28 are a single agent, one inkjet applicator 24A or 24B may be used.

If it is desirable to decouple the radiation 46 absorption from the exhibition of a different mechanical property (e.g., increased ductility), a different fusing agent 26 and ductility tailoring agent 28 may be used (even if the water-based solvent system/liquid vehicle in the two agents 26, 28 are the same). Additionally, it may be desirable for the fusing agent 26 to be separate and distinct from the ductility tailoring agent 28 when less than all of the fused layer 48 is to exhibit the different mechanical property (e.g., increased ductility). When the fusing agent 26 is a separate and distinct agent from the ductility tailoring agent 28, the water-based solvent system/liquid vehicle in the respective agents may be the same or different. As an example, the fusing agent 26 may be separate and distinct from the ductility tailoring agent 28 when the active material is not compatible in the water-based solvent system(s)/liquid vehicle(s) in which the miscible solid is compatible.

The inkjet applicator(s) 24A, 24B may be scanned across the build area platform 12 in the direction indicated by the arrow 30, e.g., along the y-axis. The inkjet applicator(s) 24A, 24B may be, for instance, a thermal inkjet printhead, a piezoelectric printhead, a continuous inkjet printhead, etc., and may extend a width of the build area platform 12. While each of the inkjet applicator(s) 24A, 24B is shown in FIG. 1 as a single applicator, it is to be understood that each of the inkjet applicator(s) 24A, 24B may include multiple inkjet applicators that span the width of the build area platform 12. Additionally, the inkjet applicator(s) 24A, 24B may be positioned in multiple printbars. The inkjet applicator(s) 24A, 24B may also be scanned along the x-axis, for instance, in configurations in which the inkjet applicator(s) 24A, 24B does/do not span the width of the build area platform 12 to enable the inkjet applicator(s) 24A, 24B to respectively deposit the fusing agent 26 and the ductility tailoring agent 28 (respectively) over a large area of a layer of build material particles 16. The inkjet applicator(s) 24A, 24B may thus be attached to a moving XY stage or a translational carriage (neither of which is shown) that moves the inkjet applicator(s) 24A, 24B adjacent to the build area platform 12 in order to deposit the fusing agent 26 and the ductility tailoring agent 28 (respectively) in predetermined areas of a layer of the build material particles 16 that has been formed on the build area platform 12 in accordance with the method(s) 100, 200 disclosed herein. The inkjet applicator(s) 24A, 24B may include a plurality of nozzles (not shown) through which the fusing agent 26 and the ductility tailoring agent 28 (respectively) are to be ejected.

The inkjet applicators 24A, 24B may respectively deliver drops of the fusing agent 26 and the ductility tailoring agent 28 at a resolution ranging from about 300 dots per inch (DPI) to about 1200 DPI. In other examples, the inkjet applicator(s) 24A, 24B may deliver drops of the respective fluids 26, 28 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, the inkjet applicators 24A, 24B are able to deliver variable size drops of the fluids 26, 28, respectively.

Each of the previously described physical elements may be operatively connected to a controller 32 of the printing system 10. The controller 32 may process print data that is based on a 3D object model of the 3D object/part 50 to be generated. In response to data processing, the controller 32 may control the operations of the build area platform 12, the build material supply 14, the build material distributor 18, and the inkjet applicator(s) 24A, 24B. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part 50. As such, the controller 32 is depicted as being in communication with a data store 34. The data store 34 may include data pertaining to a 3D part to be printed by the 3D printing system 10. The data for the selective delivery of the build material particles 16, the fusing agent 26, the ductility tailoring agent 28, etc. may be derived from a model of the 3D part to be formed. For instance, the data may include the locations on each layer of the build material particles 16 that the first inkjet applicator 24A is to deposit the fusing agent 26 and the locations that the second inkjet applicator 24B is to deposit the ductility tailoring agent 28. In one example, the controller 32 may use the data to control the first inkjet applicator 24A to selectively apply the fusing agent 26. In another example, the controller 32 may use the data to control the second inkjet applicator 24B to selectively jet the ductility tailoring agent 28. The data store 34 may also include machine readable instructions (stored on a non-transitory computer readable medium) that are to cause the controller 32 to control the amount of build material particles 16 that is supplied by the build material supply 14, the movement of the build area platform 12, the movement of the build material distributor 18, the movement of the inkjet applicator(s) 24A, 24B, etc.

As shown in FIG. 1, the printing system 10 may also include a source 36, 36' of radiation 46. In some examples, the source 36 of radiation 46 may be in a fixed position with respect to the build material platform 12. In other examples, the source 36' of radiation 46 may be positioned to apply radiation 46 (see, e.g., FIG. 2C) to the layer 40 of build material particles 16 immediately after the fusing agent 26 has been applied thereto. In the example shown in FIG. 1, the source 36' of radiation 46 is attached to the side of the inkjet applicators 24A, 24B which allows for patterning and heating/exposing to radiation 46 in a single pass.

The source 36, 36' of radiation 46 may emit radiation 46 having wavelengths ranging from about 800 nm to about 1 mm. As one example, the radiation 46 may range from about 800 nm to about 2 μm. As another example, the radiation 46 may be blackbody radiation with a maximum intensity at a wavelength of about 1100 nm. The source 36, 36' of radiation 46 may be infrared (IR) or near-infrared light sources, such as IR or near-IR curing lamps, IR or near-IR light emitting diodes (LED), or lasers with the desirable IR or near-IR electromagnetic wavelengths.

The source 36, 36' of radiation 46 may be operatively connected to a lamp/laser driver, an input/output temperature controller, and temperature sensors, which are collectively shown as radiation system components 38. The radiation system components 38 may operate together to control the source 36, 36' of radiation 46. The temperature recipe (e.g., radiation exposure rate) may be submitted to the input/output temperature controller. During heating, the temperature sensors may sense the temperature of the build material particles 16, and the temperature measurements may be transmitted to the input/output temperature controller. For example, a thermometer associated with the heated area can provide temperature feedback. The input/output temperature controller may adjust the source 36, 36' of radiation 46 power set points based on any difference between the recipe and the real-time measurements. These power set points are sent to the lamp/laser drivers, which transmit appropriate lamp/laser voltages to the source 36, 36' of radiation 46. This is one example of the radiation system components 38, and it is to be understood that other radiation source control systems may be used. For example, the controller 32 may be configured to control the source 36, 36' of radiation 46.

Referring now to FIGS. 2A through 2E, an example of the 3D printing method 100 is depicted. This method 100 may be used to form 3D printed parts 50 (see, e.g., FIG. 4) with increased ductility.

Prior to execution of the method 100 or as part of the method 100, the controller 32 may access data stored in the data store 34 pertaining to a 3D part that is to be printed. The controller 32 may determine the number of layers of build material 16 that are to be formed, the locations at which the fusing agent 26 from the first inkjet applicator 24A is to be deposited on each of the respective layers, and the locations at which the ductility tailoring agent 28 from the second inkjet applicator 24B is to be deposited on each of the respective layers.

Figure 2A:
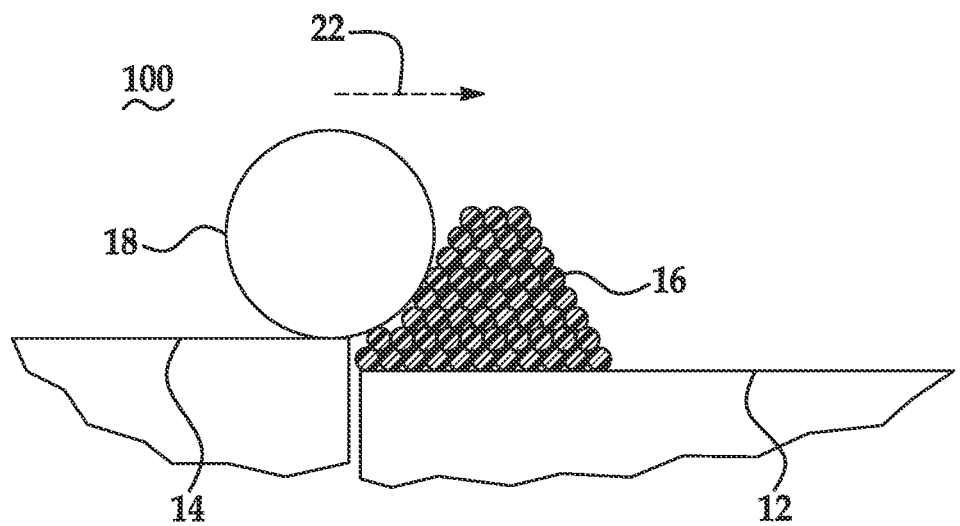
FIGS. 2A through 2E are schematic and partially cross-sectional views depicting the formation of a 3D part using an example of a 3D printing method disclosed herein.
Figure 2B:
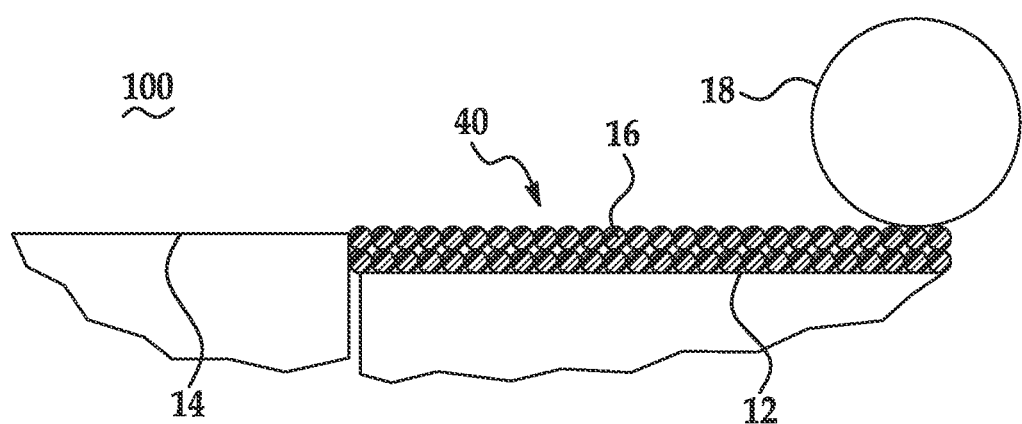

As shown in FIGS. 2A and 2B, the method 100 includes applying the build material 16 containing an amide functionality. In FIG. 2A, the build material supply 14 may supply the build material particles 16 into a position so that they are ready to be spread onto the build area platform 12. In FIG. 2B, the build material distributor 18 may spread the supplied build material particles 16 onto the build area platform 12. The controller 32 (not shown in FIGS. 2A and 2B) may process control build material supply data, and in response control the build material supply 14 to appropriately position the build material particles 16, and may process control spreader data, and in response control the build material distributor 18 to spread the supplied build material particles 16 over the build area platform 12 to form a layer 40 of build material particles 16 thereon. As shown in FIG. 2B, one layer 40 of the build material particles 16 has been applied.

The layer 40 has a substantially uniform thickness across the build area platform 12. In an example, the thickness of the layer 40 is about 100 μm. In another example, the thickness of the layer 40 ranges from about 50 μm to about 300 μm, although thinner or thicker layers may also be used. For example, the thickness of the layer 40 may range from about 20 μm to about 500 μm, or from about 30 μm to about 300 μm. The layer thickness may be about 2× (i.e., 2 times) the particle diameter (as shown in FIG. 2B) at a minimum for finer part definition. In some examples, the layer thickness may be about 1.2× the particle diameter.

Prior to further processing, the layer 40 of the build material particles 16 may be exposed to heating. Heating may be performed to pre-heat the build material particles 16, and thus the heating temperature may be below the melting point or softening point of the build material particles 16. As such, the temperature selected will depend upon the build material particles 16 that are used. As examples, the pre-heating temperature may be from about 5° C. to about 50° C. below the melting point or softening point of the build material particles 16. In an example, the pre-heating temperature ranges from about 50° C. to about 250° C. In another example, the pre-heating temperature ranges from about 150° C. to about 170° C.

Pre-heating the layer 40 of the build material particles 16 may be accomplished using any suitable heat source that exposes all of the build material particles 16 on the build material surface 12 to the heat. Examples of the heat source include a thermal heat source (e.g., a heater (not shown) integrated into the platform 12) or the radiation source 36, 36'.

Figure 2C:
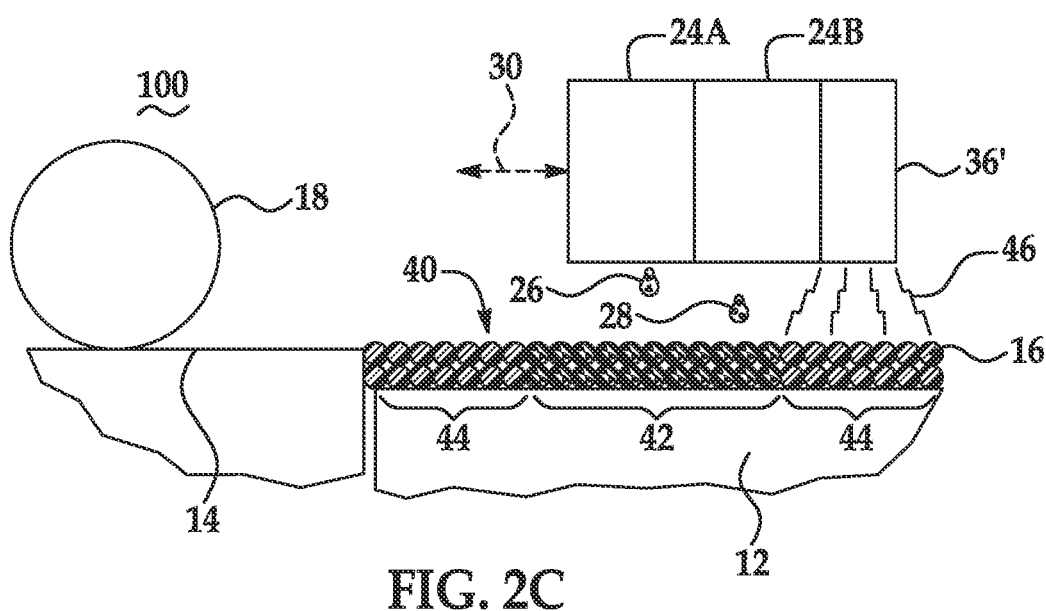

Referring now to FIG. 2C, after the layer 40 is formed, and in some instances is pre-heated, at least a portion 42 of the build material 16 is patterned. As shown in FIG. 2C the patterning of the portion 42 includes selectively applying the fusing agent 26 on the portion 42 of the build material 16, and selectively jetting the ductility tailoring agent 28 on at least a region of the portion 42.

As mentioned above, the fusing agent 26 includes the active material and the FA vehicle.

As also mentioned above, the ductility tailoring agent 28 includes the miscible solid and the water-based solvent system.

As illustrated in FIG. 2C, the fusing agent 26 may be dispensed from the first inkjet applicator 24A, and the ductility tailoring agent 28 may be dispensed from the second inkjet applicator 24B. In an example, the fusing agent 26 may be dispensed onto the portion 42 first, and then the ductility tailoring agent 28 may be dispensed onto a region of the portion 42. In another example, the ductility tailoring agent 28 may be dispensed onto a region of the portion 42 first, and then the fusing agent 26 may be dispensed onto the portion 42. In still another example, the fusing agent 26 and the ductility tailoring agent 28 may be dispensed at least substantially simultaneously (e.g., one immediately after the other in a single printing pass, or at the same time).

Although shown as separate inkjet applicators 24A, 24B, it is to be understood that a single inkjet applicator with individual cartridges for dispensing the respective fluids 26, 28 may be used. In still other examples, a single inkjet applicator 24A or 24B with a single cartridge may be used to dispense a fusing/ductility tailoring agent. When the fusing/ductility tailoring agent (which combines the fusing agent 26 and the ductility tailoring agent 28) is used, the selective application is accomplished in a single step. In these examples, all of the layer may include a composite portion 52 (see, e.g., FIG. 4), which contains the miscible solid bonded to the fused build material. In an example of the method 100, the ductility tailoring agent 28 and the fusing agent 26 are combined into a single fusing/ductility tailoring agent and all of the layer 46 includes the composite portion 52.

It is to be understood that, in some examples of the method 100, the selectively applying of the fusing agent 26 and the selectively jetting of the ductility tailoring agent 28 are accomplished separately. In these examples, the fusing agent 26 and the ductility tailoring agent 28 are separate fluids. The fusing agent 26 may be applied prior to the jetting of the ductility tailoring agent 28 or the ductility tailoring agent 28 may be jetted prior to the application of the fusing agent 26. In an example of the method 100, the selectively applying of the fusing agent 26 is accomplished separate from and prior to the selectively jetting of the ductility tailoring agent 28; or the selectively jetting of the ductility tailoring agent 28 is accomplished separate from and prior to the selectively applying of the fusing agent 26.

The inkjet applicators 24A and/or 24B may each be a thermal inkjet printhead, a continuous inkjet printhead, a piezoelectric printhead, etc., and each of the selectively applying of the fusing agent 26 and the selectively jetting of the ductility tailoring agent 28 may be accomplished by thermal inkjet printing, continuous inkjet printing, piezo-electric inkjet printing, etc. In an example, the selectively jetting of the ductility tailoring agent 28 is accomplished by thermal inkjet printing, continuous inkjet printing, or piezo-electric inkjet printing.

The fusing agent 26 and the ductility tailoring agent 28 each may be dispensed at a contone level ranging from about 10 contone to about 255 contone (which refers to the number of drops, which is divided by 256, that will be placed on average onto each pixel).

The controller 32 may process data, and in response, control the first inkjet applicator 24A (e.g., in the directions indicated by the arrow 30) to deposit the fusing agent 26 onto predetermined portion(s) 42 of the build material 16 that are to become part of the 3D part 50. The first inkjet applicator 24A may be programmed to receive commands from the controller 32 and to deposit the fusing agent 26 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 2C, the first inkjet applicator 24A selectively applies the fusing agent 26 on those portion(s) 42 of the layer 40 that is/are to become the first layer of the 3D part 50. As an example, if the 3D part that is to be formed is to be shaped like a cube or cylinder, the fusing agent 26 will be deposited in a square pattern or a circular pattern (from a top view), respectively, on at least a portion of the layer 40 of the build material particles 16. In the example shown in FIG. 2C, the fusing agent 26 is deposited in a square pattern on the portion 42 of the layer 40 and not on the portions 44.

The controller 32 may also process data, and in response, control the second inkjet applicator 24B (e.g., in the directions indicated by the arrow 30) to deposit the ductility tailoring agent 28 onto predetermined region(s) of the portion 42 of the build material 16 that are to form the composite portion 52. When the composite portion 52 is less than all of the layer, the composite portion 52 exhibits a different mechanical property (e.g., increased ductility) than that of an area of the layer not in contact with the miscible solid. When the composite portion 52 is all of the layer, the entire layer exhibits increased ductility, e.g., compared to a similar layer formed without the miscible solid. The second inkjet applicator 24B may be programmed to receive commands from the controller 32 and to deposit the ductility tailoring agent 28 according to a pattern of a cross-section for the region (of the layer of the 3D part that is to be formed) that is to form the composite portion 52 and exhibit increased ductility. In the example shown in FIG. 2C, the second inkjet applicator 24B selectively jets the ductility tailoring agent 28 on those region(s) of the portion 42 of the layer 40 that are to form the composite portion(s) 52 and exhibit increased ductility in the first layer of the 3D part 50. In the example shown in FIG. 2C, the ductility tailoring agent 28 is deposited in a square pattern on the portion 42 of the layer 40 and not on the portions 44.

As mentioned above, the fusing agent 26 may include the active material (e.g., the plasmonic resonance absorber or other radiation absorber) and the FA vehicle. The volume of the fusing agent 26 that is applied per unit of the build material 16 in the patterned portion 42 may be sufficient to absorb and convert enough radiation 46 so that the build material 16 in the patterned portion 42 will fuse. The volume of the fusing agent 26 that is applied per unit of the build material 16 may depend, at least in part, on the active material used, the active material loading in the fusing agent 26, and the build material 16 used.

When the ductility tailoring agent 28 is selectively jetted on the desired area(s) of the portion(s) 42, the miscible solid (present in the ductility tailoring agent 28) infiltrates the inter-particles spaces among the build material 16 and forms a physical bond with the amide functionality (i.e., amide group(s)) of the build material 16. In an example, the miscible solid is to hydrogen bond with the amide functionality of the build material 16. In another example the miscible solid is to form a van der Waals bond with the amide functionality of the build material 16. The volume of the ductility tailoring agent 28 that is jetted per unit of the build material 16 in the patterned portion 42 may be sufficient to achieve a desired number of physical bonds between the miscible solid and the amide functionality of the build material 16, and thus, a desired ductility level.

In some examples, such as the example shown in FIG. 2C, the fusing agent 26 and the ductility tailoring agent 28 are jetted on the same portion(s) (e.g., portion 42). In these examples, the composite portion 52 of the layer containing the miscible solid and thus, exhibiting the different mechanical property (e.g., increased ductility) is the entire layer 48 of the 3D part 50. In other examples, the fusing agent 26 is applied on portion(s) on which the ductility tailoring agent 28 is not jetted. In these examples, the composite portion 52 containing the miscible solid and thus, exhibiting the different mechanical property (e.g., increased ductility) is less than the entire layer of the 3D part 50.

While the portion 42 of the layer 40 is shown having both the fusing agent 26 and the ductility tailoring agent 28 applied thereto, it is to be understood that in some examples of the method 100, some area(s) of the portion 42 may have the fusing agent 26 applied thereto, but may not have the ductility tailoring agent 28 applied thereto. These area(s) of the portion 42 will become part of the 3D part that is formed, but will not exhibit increased ductility. As such, these area(s) do not become part of the composite portion 52 that exhibits the increased ductility. Rather, these area(s) make up a portion of the 3D part that has the mechanical properties of the fused build material 16 without the miscible solid physically bonded thereto.

In some examples of the method 100, when the composite portion 52 is to be less than all of the fused layer, the selectively applying of the fusing agent 26 includes applying a greater amount of the fusing agent 26 to the region of the portion 42 on which the ductility tailoring agent 28 is jetted than to a remaining region of the portion 42 on which the ductility tailoring agent 28 is not jetted. It may be desirable to apply a greater amount of the fusing agent 26 to the region than to the remaining region to compensate for a cooling effect that the ductility tailoring agent 28 may have on the region on which it is jetted. For example, the evaporation of the water-based solvent system of the ductility tailoring agent 28 may decrease the temperature of the build material 16. The greater amount of the fusing agent 26 applied to the region may absorb more radiation 46 and convert that additional radiation 46 to thermal heat. Thus, the greater amount of the fusing agent 26 may partially or completely compensate for a decrease in temperature due to the ductility tailoring agent 28.

In some other examples of the method 100, when the composite portion 52 is less than all of the fused layer, the selectively applying of the fusing agent 26 includes selectively applying an at least substantially similar amount of the fusing agent 26 to the region of the portion 42 (on which the ductility tailoring agent 28 is jetted) and to the remaining region of the portion 42 (on which the ductility tailoring agent 28 is not jetted) at different times, or at a different time than when the ductility tailoring agent 28 is selectively applied. In an example, the same amount of fusing agent 26 may be applied to the region and the remaining region, and timing of the fusing agent 26 application and the ductility tailoring agent 28 application may be separated. It may be desirable to apply the fusing agent 26 and the ductility tailoring agent 28 at different times to compensate for thermal differences at the region and the remaining region, which may result from a cooling effect that the ductility tailoring agent 28 may have on the region on which it is jetted. As mentioned above, the evaporation of the water-based solvent system of the ductility tailoring agent 28 may decrease the temperature of the build material 16. Applying the fusing agent 26 at different times between the region and the remaining region gives more time for solvent evaporation and thus, may allow the both the region and the remaining region to be at the same temperature(s) with the same amount of fusing agent 26 applied.

In an example of the method 100, the composite portion 52 is less than all of the layer; and one of: i) the selectively applying of the fusing agent 26 includes applying a greater amount of the fusing agent 26 to the region of the portion 42 than to a remaining region of the portion 42; or ii) the selectively applying of the fusing agent 26 includes selectively applying an at least substantially similar amount to the region of the portion 42 and to the remaining region of the portion 42 at different times.

In still other examples of the method 100, it may not be desirable to compensate or to fully compensate for the cooling effect of the ductility tailoring agent 28. The miscible solid may decrease the melting temperature of the build material 16 on which it is jetted. Thus, the build material 16 in the region on which the ductility tailoring agent 28 is jetted may fuse at a temperature lower than the temperature at which the build material 16 in the remaining region will fuse. In these examples, the same amount of fusing agent 26 may be applied on the entire portion 42 at the same time and the entire layer will fuse. Alternatively, in these examples, the cooling effect may be partially compensated for by applying a greater amount of the fusing agent 26 to the region than to the remaining region (but not enough to reach the same temperature as the remaining region) or by giving more time for solvent evaporation (but not enough to reach the same temperature as the remaining region).

In still other examples of the method 100, the composite portion 52 is all of the layer. In these examples, it is not necessary to compensate for a cooling effect of the ductility tailoring agent 28. In these examples, the ductility tailoring agent 28 is jetted on all of the portion 42 to which the fusing agent 26 is applied. Thus, the entire portion 42 may be at the same temperature(s) when the same amount of fusing agent 26 is applied at the same time. In these examples, the same amount of fusing agent 26 may be applied at the same time on the entire portion 42.

It is to be understood that a single fusing agent 26 may be selectively applied on the portion 42, or multiple fusing agents 26 may be selectively applied on the portion 42. When multiple fusing agents 26 are utilized, each is capable of absorbing enough radiation 46 so that the build material 16 in the patterned portion 42 will fuse. As an example, multiple fusing agents 26 may be used when the fusing agent 26 and the ductility tailoring agent 28 are combined (i.e., the fusing/ductility tailoring agent), and another fusing agent 26 is applied on another portion of the build material 16 to which the ductility tailoring agent 28 is not jetted.

While not shown, in some examples, the method 100 may further include selectively jetting another or second ductility tailoring agent including another or second miscible solid on a portion of the build material 16. The other or second ductility tailoring agent may be used to introduce another or second miscible solid, which may be different than the miscible solid in the ductility tailoring agent 28, to the layer 40. In this example, the fused layer 48 may exhibit a ductility level which is different than the ductility level imparted by the miscible solid in the ductility tailoring agent 28.

The other or second ductility tailoring agent may be jetted on the same portion(s) (e.g., portion 42) as, or different portion(s) than, the portion(s) (e.g., portion 42) on which ductility tailoring agent 28 is jetted. For example, if it is desirable to form a gradient of ductility levels, both ductility tailoring agents may be jetted on the portion that is to have high ductility, and one of the ductility tailoring agents may be jetted on the portion that is to have medium ductility, and the other ductility tailoring agent may be jetted on the portion that is to have low ductility.

The other or second ductility tailoring agent may be jetted on the build material 16 with one of the inkjet applicators 24A, 24B (from a separate cartridge for dispensing the other or second ductility tailoring agent) or with a third inkjet applicator (not shown) that may be similar to the inkjet applicators 24A, 24B.

In some examples of the method 100, the method 100 includes forming the ductility tailoring agent 28 prior to the patterning. For example, the method 100 further comprises forming the ductility tailoring agent 28 by: combining the miscible solid, the water-based solvent, and the humectant to form a stock solution; and combining a predetermined amount of the stock solution with the jettable composition.

In an example, the stock solution is formed by combining the miscible solid, the water-based solvent and the humectant. The miscible solid is as described above. The water-based solvent may be water or any of the co-solvents described above, and the humectant may be any of the humectants described above. In an example, the stock solution may include about 40 wt % of the miscible solid, about 20 wt % of the water-based solvent, and about 40 wt % of the humectant. In other examples, greater or lesser amounts of each component may be used.

After the stock solution is formed, a predetermined amount of the stock solution may be combined with the jettable composition. The combination of the stock solution with the jettable composition forms the ductility tailoring agent 28. The water-based solvent and the humectant of the stock solution and the jettable composition form the water-based solvent system.

The jettable composition may include water and/or any of the co-solvent(s), humectant(s), surfactant(s), antimicrobial agent(s), anti-kogation agent(s), chelating agent(s), scale inhibitor(s), anti-deceleration agent(s), and/or dispersant(s) described above. In an example, the jettable composition includes an anti-kogation agent, a surfactant, an antimicrobial agent, a co-solvent, or combinations thereof. In an example, the predetermined amount of the stock solution is equal to the amount of the jettable composition. In other examples, the predetermined amount of the stock solution may be greater than or less than the amount of the jettable composition. In another example, the predetermined amount of the stock solution that is combined with the jettable composition renders the ductility tailoring agent 28 with the miscible solid present in an amount of about 10 wt % to about 75 wt %.

Figure 2D:
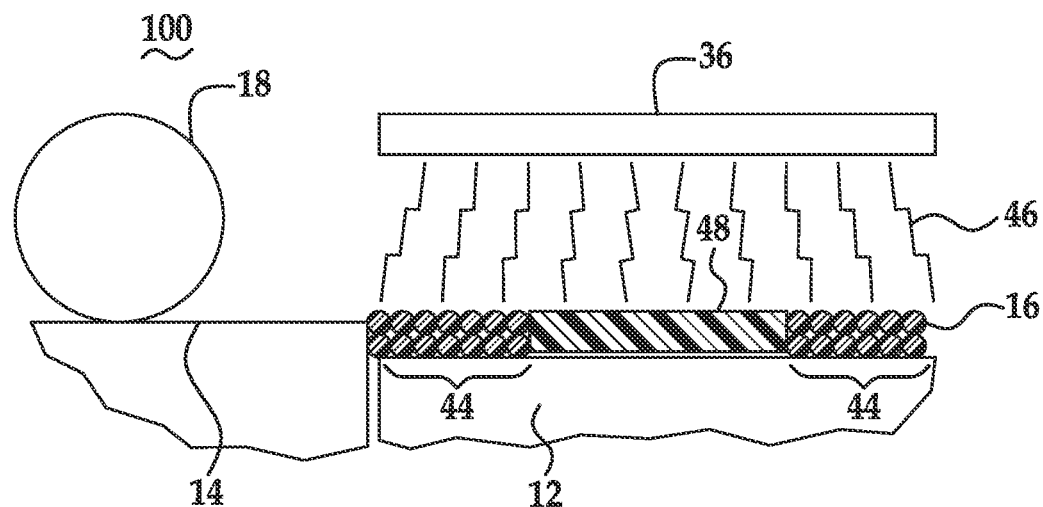

After selectively applying the fusing agent 26 and selectively jetting the ductility tailoring agent 28, the build material 16, including the patterned portion, is exposed to radiation 46. The radiation 46 may be applied with the source 36 of radiation 46 as shown in FIG. 2D or with the source 36' of radiation 46 as shown in FIG. 2C.

The fusing agent 26 enhances the absorption of the radiation 46, converts the absorbed radiation 46 to thermal energy, and promotes the transfer of the thermal heat to the build material particles 16 in contact therewith. In an example, the fusing agent 26 sufficiently elevates the temperature of the build material particles 16 in layer 40 above the melting or softening point of the particles 16, allowing fusing (e.g., sintering, binding, curing, etc.) of the build material particles 16 to take place. The application of the radiation 46 forms the fused layer 48, as shown in FIG. 2D.

It is to be understood that portions 44 of the build material 16 that do not have the fusing agent 26 applied thereto do not absorb enough radiation 46 to fuse. As such, these portions 44 do not become part of the 3D part 50 that is ultimately formed. The build material 16 in portions 44 may be reclaimed to be reused as build material 16 in the printing of another 3D part.

Figure 2E:
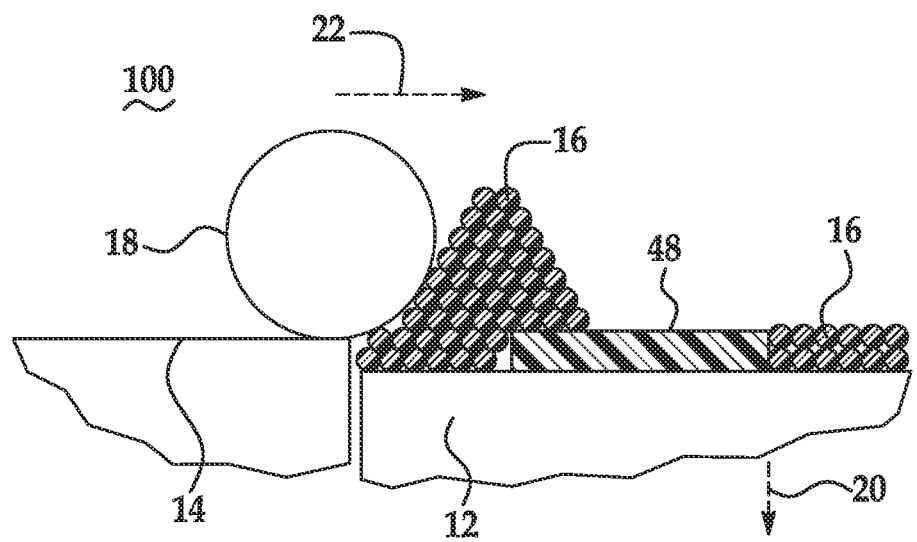

The processes shown in FIGS. 2A through 2D may be repeated to iteratively build up several fused layers and to form the 3D printed part 50. FIG. 2E illustrates the initial formation of a second layer of build material particles 16 on the previously formed layer 48. In FIG. 2E, following the fusing of the predetermined portion(s) 42 of the layer 40 of build material 16, the controller 32 may process data, and in response cause the build area platform 12 to be moved a relatively small distance in the direction denoted by the arrow 20. In other words, the build area platform 12 may be lowered to enable the next layer of build material particles 16 to be formed. For example, the build material platform 12 may be lowered a distance that is equivalent to or at least the height of the layer 48. In addition, following the lowering of the build area platform 12, the controller 32 may control the build material supply 14 to supply additional build material particles 16 (e.g., through operation of an elevator, an auger, or the like) and the build material distributor 18 to form another layer of build material particles 16 on top of the previously formed layer with the additional build material 16. The newly formed layer may be in some instances pre-heated, patterned with the fusing agent 26, patterned with the ductility tailoring agent 28, and then exposed to radiation 46 from the source 36, 36' of radiation 46 to form the additional fused layer.

Figure 3:
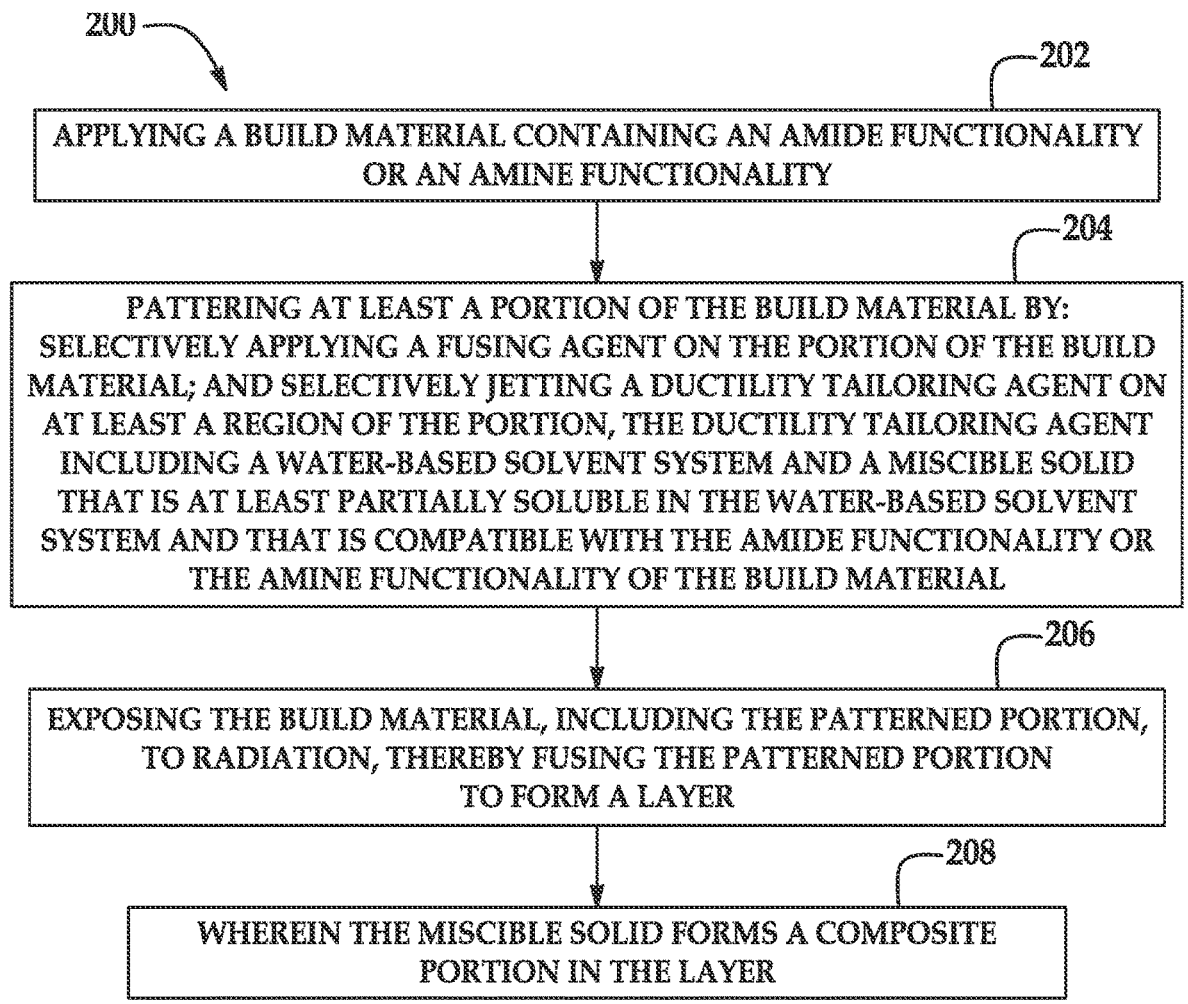
FIG. 3 is a flow diagram illustrating examples of a 3D printing method disclosed herein.

An example of the 3D printing method 200 is depicted in FIG. 3. It is to be understood that examples of the method 200 are discussed in detail herein, e.g., in FIGS. 2A through 2E and the text corresponding thereto.

As shown at reference numeral 202, the method 200 includes applying the build material 16 containing an amide functionality.

As shown at reference numeral 204, the method 200 further includes patterning at least a portion 42 of the build material 16 by: selectively applying the fusing agent 26 on the portion 42 of the build material 16; and selectively jetting the ductility tailoring agent 28 on at least a region of the portion 42, the ductility tailoring agent 28 including a water-based solvent system and a miscible solid that is at least partially soluble in the water-based solvent system and that is compatible with the amide functionality of the build material 16.

As shown at reference numeral 206, the method 200 further includes exposing the build material 16, including the patterned portion 42, to radiation 46, thereby fusing the patterned portion 42 to form a layer 48.

As shown at reference numeral 208, the miscible solid forms a composite portion 52 in the layer.

Examples of the system 10 and method 100, 200 disclosed herein may be used to form the 3D printed part 50 shown in FIG. 4. As shown in FIG. 4, the 3D printed part 50 may include a plurality of fused layers (e.g., fused layer 48). The fused layers of the 3D printed part 50 include exterior layer(s) 54 and interior layer(s) 56. As used herein, the term "exterior layer" refers to a layer or a portion of a layer that forms part of the outside or shell of the 3D printed part 50. As used herein, the term "interior layer" refers to a layer or a portion of a layer that forms part of the inside or core of the 3D printed part 50.

At least some of the fused layers include a composite portion 52. The composite portion(s) 52 correspond(s) to the region(s) of the layer(s) on which the ductility tailoring agent 28 is jetted during the printing process 100, 200. The composite portions 52 have the miscible solid physically bonded (e.g., hydrogen bonded or van der Waals bonded) to an amide functionality (i.e., amide group) of the build material 16. Thus, the composite portions have a different mechanical property (e.g., increased ductility) than that of an area of the layer not in contact with the miscible solid, or than other layer(s) not in contact with the miscible solid. In an example, at least some of the interior layers 56 include a composite portion 52. In this example, at least some of the exterior layers 54 include the composite portion 52 having the miscible solid physically bonded to the amide functionality of the build material 16. It is to be understood that in some examples, each layer of the 3D part 50 (and thus the entire 3D part 50) may be formed of the composite portion 52.

As mentioned above, the miscible solid is solid at room temperature (e.g., a temperature ranging from about 18° C. to about 25° C.). As also mentioned above, in some examples, the miscible solid is selected from the group consisting of 2-methyl-benzene sulfonamide, a mixture of 4-methyl-benzene and 2-methyl-benzene sulfonamide, N-butylbenzenesulfonamide (BBSA), N-ethylbenzenesulfonamide (EBSA), N-propylbenzenesulfonamide (PBSA), N-butyl-N-dodecylbenzenesulfonamide (BDBSA), N,N-dimethylbenzenesulfonamide (DMBSA), p-methylbenzenesulfonamide, o/p-toluene sulfonamide, p-toluene sulfonamide, 2-ethylhexyl-4-hydroxybenzoate, hexadecyl-4-hydroxybenzoate, 1-butyl-4-hydroxybenzoate, dioctyl phthalate, diisodecyl phthalate, di-(2-ethylhexyl) adipate, tri-(2-ethylhexyl) phosphate, and combinations thereof.

In an example, the 3D printed part 50 comprises a plurality of fused build material layers including exterior layers 54 and interior layers 56, at least some of the interior layers 56 including a composite portion 52 having a miscible solid physically bonded to an amide functionality of the build material 16, the miscible solid being a solid at a room temperature ranging from about 18° C. to about 25° C.

To further illustrate the present disclosure, examples are given herein. It is to be understood that these examples are provided for illustrative purposes and are not to be construed as limiting the scope of the present disclosure.

EXAMPLES

Example 1

An example ductility tailoring agent was prepared. An example stock solution was prepared by combining methyl-benzene sulfonamide as the miscible solid, 2-pyrrolidone as the humectant, and water as the water-based solvent. The general formulation of the example stock solution is shown in Table 1, with the wt % of each component that was used.

TABLE 1

| Ingredient | Specific component | Composition 1 (wt %) |
|---|---|---|
| Miscible solid | Methyl-benzene sulfonamide | 40 |
| Humectant | 2-pyrrolidone | 40 |
| Water-based solvent | Water | 20 |

The example stock solution was combined with an example jettable composition to form the example ductility tailoring agent. The general formulation of the example jettable composition is shown in Table 2, with the wt % of each component that was used.

TABLE 2

| Ingredient | Specific component | Vehicle (wt %) |
|---|---|---|
| Co-solvent | 2-pyrrolidone | 40 |
| Anti-kogation agent | CRODAFOS ® O3A | 1 |
| Surfactants | SURFYNOL ® SEF | 1.5 |
|  | CAPSTONE ® FS-35 | 0.10 |
| Scale inhibitor/Anti-deceleration agent | DOWFAX ™ 2A1 | 0.20 |
| Chelating agent | TRILON ® M | 0.08 |
| Biocide | PROXEL ® GXL | 0.36 |
|  | DI (deionized) Water | Balance |

Equal amounts of the example stock solution and the example jettable composition were combined. The example ductility tailoring agent formed was jettable via thermal inkjet printheads.

Example 2

Example 3D printed parts were printed and two comparative 3D printed parts were printed. The build material used to print the example and comparative parts was polyamide-12 (PA-12). The general formulation of the fusing agent used to print the example and comparative parts is shown in Table 3.

TABLE 3

| Ingredient | Specific component(s) | Fusing Agent (wt %) |
|---|---|---|
| 1% Dye solution | Metal bis(dithiolene) complex 2-pyrrolidone Pentanol TINUVIN ® 770 | 50 |
| Fusing Agent Vehicle | 1-methyl-2-pyrrolidone CRODAFOS ® O3A SURFYNOL ® SEF CAPSTONE ® FS-35 DOWFAX ™ 2A1 TRILON ® M PROXEL ® GXL DI (deionized) Water | 50 |

The ductility tailoring agent from Example 1 was used to print the example parts. No ductility tailoring agent was used to print the comparative example parts.

For the example parts, each layer of powder was applied, patterned with the fusing agent and the ductility tailoring agent, and exposed to radiation using a 650 W 120 V Ushio Lamp. Each resulting example part had 40 layers. The example ductility tailoring agent was jetted everywhere the fusing agent was applied on the layers of the example parts. The various example parts were formed with different contone levels of the miscible solid (as shown in Table 4).

For the comparative example parts, each layer of powder was applied, patterned with the fusing agent, and exposed to radiation using a 650 W 120 V Ushio Lamp. Each resulting comparative example part had 40 layers.

Each of the example and comparative example parts was tested for maximum tensile stress and % elongation at break. In this test, a Lloyd Tensile Tester (i.e., the LRX Plus) was utilized. This tester pulls the parts at 2 mm/min.

Table 4 illustrates the mechanical properties of the example and comparative example parts, as well as the contone level of the miscible solid.

TABLE 4

| Part name | Contone Level of Miscible solid | Max Stress (MPa) | % Elongation at break |
| --- | --- | --- | --- |
| Example part 1 | 1000 | 29.28 | 84.83 |
| Example part 2 | 1000 | 27.71 | 99.94 |
| Example part 3 | 1000 | 35.39 | 80.25 |
| Example part 4 | 1000 | 34.08 | 98.57 |
| Example part 5 | 500 | 31.99 | 52.15 |
| Comparative Example part 6 | 0 | 43.50 | 26.16 |
| Comparative Example part 7 | 0 | 46.85 | 24.55 |

In general, the maximum tensile stress was lowered by at least 8 MPa when the ductility tailoring agent was used, and the elongation at break was increased from to 50-100% based on the contone level of the miscible solid added.

It is to be understood that the ranges provided herein include the stated range and any value or sub-range within the stated range. For example, a range from about wt % to about 75 wt % should be interpreted to include not only the explicitly recited limits of from about 10 wt % to about 75 wt %, but also to include individual values, such as 10 wt %, 25.5 wt %, 54 wt %, 70.85 wt %, etc., and sub-ranges, such as from about wt % to about 65 wt %, from about 20.55 wt % to about 70.7 wt %, from about 15 wt % to about 71 wt %, etc. Furthermore, when "about" or the symbol "-" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing system, comprising:
    a first supply containing a build material having an amide functionality or an amine functionality;
    a build material distributor to dispense the build material;
    a second supply containing a fusing agent;
    a third supply containing an inkjettable ductility tailoring agent, the inkjettable ductility tailoring agent including a water-based solvent system and a miscible solid that is at least partially soluble in the water-based solvent system and that is compatible with the amide functionality or the amine functionality of the build material; and
    first and second inkjet applicators to selectively dispense the fusing agent and the inkjettable ductility tailoring agent, respectively, to pattern layers of the build material during a three-dimensional printing process;
    wherein the miscible solid is selected from the group consisting of: 2-methyl-benzene sulfonamide, a mixture of 4-methyl-benzene and 2-methyl-benzene sulfonamide, N-ethylbenzenesulfonamide, N-propylbenzenesulfonamide, N-butyl-N-dodecylbenzenesulfonamide, N,N-dimethylbenzenesulfonamide, p-methylbenzenesulfonamide, o/p-toluene sulfonamide, p-toluene sulfonamide, 2-ethylhexyl-4-hydroxybenzoate, hexadecyl-4-hydroxybenzoate, 1-butyl-4-hydroxybenzoate, tri-(2-ethylhexyl) phosphate, and combinations thereof.

2. The 3D printing system as defined in claim 1, wherein:
    the miscible solid is present in the inkjettable ductility tailoring agent in an amount of from about 10 wt % to about 75 wt %; and
    the water-based solvent system includes at least 25 wt % of water.

3. The 3D printing system as defined in claim 1 wherein the water-based solvent system is selected from the group consisting of water, N-2-hydroxyethyl-2-pyrrolidone, 1,6-hexanediol, dimethyl sulfoxide (DMSO), isopropyl alcohol, ethanol, acetone, 2-pyrrolidinone, and mixtures thereof.

4. The 3D printing system as defined in claim 1 wherein the inkjettable ductility tailoring agent further includes:
    a humectant present in an amount of from about 20 wt % to about 40 wt %; or
    a surfactant present in an amount of from about 0.1 wt % to about 4 wt %.

5. The 3D printing system as defined in claim 1 wherein the inkjettable ductility tailoring agent is a first inkjettable ductility tailoring agent, and the system further comprises:
    a fourth supply containing a second inkjettable ductility tailoring agent; and
    a third inkjet applicator to selectively dispense the second inkjettable ductility tailoring agent to further pattern at least some of the layers of the build material during the three-dimensional printing process;
    wherein the miscible solid of the first inkjettable ductility tailoring agent is a first miscible solid, and wherein the second inkjettable ductility tailoring agent includes a second miscible solid that is different from the first miscible solid.

6. The 3D printing system as defined in claim 1 wherein the first and second inkjet applicators are individually selected from the group consisting of a thermal inkjet printhead, a continuous inkjet printhead, and a piezoelectric inkjet printhead.

7. A three-dimensional (3D) printing system, comprising:
a first supply containing a build material having an amide functionality or an amine functionality;
a build material distributor to dispense the build material;
a second supply containing a fusing agent;
a third supply containing an inkjettable ductility tailoring agent, the inkjettable ductility tailoring agent including a water-based solvent system and a miscible solid that is at least partially soluble in the water-based solvent system and that is compatible with the amide functionality or the amine functionality of the build material; and
first and second inkjet applicators to selectively dispense the fusing agent and the inkjettable ductility tailoring agent, respectively, to pattern layers of the build material during a three-dimensional printing process;
wherein the miscible solid of the inkjettable ductility tailoring agent is selected from the group consisting of: 2-methyl-benzene sulfonamide, a mixture of 4-methyl-benzene and 2-methyl-benzene sulfonamide, N-butyl-benzenesulfonamide, N-ethylbenzenesulfonamide, N-propylbenzenesulfonamide, N-butyl-N-dodecylbenzenesulfonamide, N,N-dimethylbenzenesulfonamide, p-methylbenzenesulfonamide, o/p-toluene sulfonamide, p-toluene sulfonamide, 2-ethylhexyl-4-hydroxybenzoate, hexadecyl-4-hydroxybenzoate, 1-butyl-4-hydroxybenzoate, dioctyl phthalate, diisodecyl phthalate, di-(2-ethylhexyl) adipate, tri-(2-ethylhexyl) phosphate, and combinations thereof.

8. The 3D printing system as defined in claim 7 wherein the miscible solid is present in the inkjettable ductility tailoring agent in an amount of from about 10 wt % to about 75 wt %.

9. The 3D printing system as defined in claim 7 wherein the miscible solid is present in the inkjettable ductility tailoring agent in an amount of from about 35 wt % to about 75 wt %.

10. The 3D printing system as defined in claim 7, wherein the water-based solvent system is selected from the group consisting of water, N-2-hydroxyethyl-2-pyrrolidone, 1,6-hexanediol, dimethyl sulfoxide (DMSO), isopropyl alcohol, ethanol, acetone, 2-pyrrolidinone, and mixtures thereof.

11. The 3D printing system as defined in claim 7 wherein the water-based solvent system includes at least 25 wt % of water.

12. The 3D printing system as defined in claim 7 wherein the inkjettable ductility tailoring agent further includes a humectant present in an amount of from about 20 wt % to about 40 wt %.

13. The 3D printing system as defined in claim 12 wherein the humectant is selected from the group consisting of 1-methyl-2-pyrrolidone, N-2-hydroxyethyl-2-pyrrolidone, 2-pyrrolidinone, and combinations thereof.

14. The 3D printing system as defined in claim 7 wherein the inkjettable ductility tailoring agent further includes a surfactant present in an amount of from about 0.1 wt % to about 4 wt %.

15. The 3D printing system as defined in claim 14 wherein the surfactant is selected from the group consisting of an acetylenic diol-based nonionic surfactant, a nonionic fluorosurfactant, and combinations thereof.

16. The 3D printing system as defined in claim 7 wherein the first and second inkjet applicators are individually selected from the group consisting of a thermal inkjet printhead, a continuous inkjet printhead, and a piezoelectric inkjet printhead.

17. The 3D printing system as defined in claim 7, further comprising:
a controller; and
a non-transitory computer readable medium having stored thereon computer executable instructions to cause the controller to:
utilize the build material distributor to dispense the build material; and
utilize the first inkjet applicator and the second inkjet applicator to respectively and selectively dispense the fusing agent and the inkjettable ductility tailoring agent to pattern the layers of the build material during the three-dimensional printing process.

18. The 3D printing system as defined in claim 7 wherein the inkjettable ductility tailoring agent is a first inkjettable ductility tailoring agent, and the system further comprises:
a fourth supply containing a second inkjettable ductility tailoring agent; and
a third inkjet applicator to selectively dispense the second inkjettable ductility tailoring agent to further pattern at least some of the layers of the build material during the three-dimensional printing process.

19. The 3D printing system as defined in claim 18 wherein the miscible solid of the first inkjettable ductility tailoring agent is a first miscible solid, and wherein the second inkjettable ductility tailoring agent includes a second miscible solid that is different from the first miscible solid.

20. The 3D printing system as defined in claim 7, further comprising a radiation source attached to the first inkjet applicator, the radiation source to apply radiation to the layers of the build material once the fusing agent has been dispensed, wherein the radiation source emits radiation at a wavelength ranging from about 800 nm to about 1 mm.

* * * * *